Patented Apr. 22, 1924.

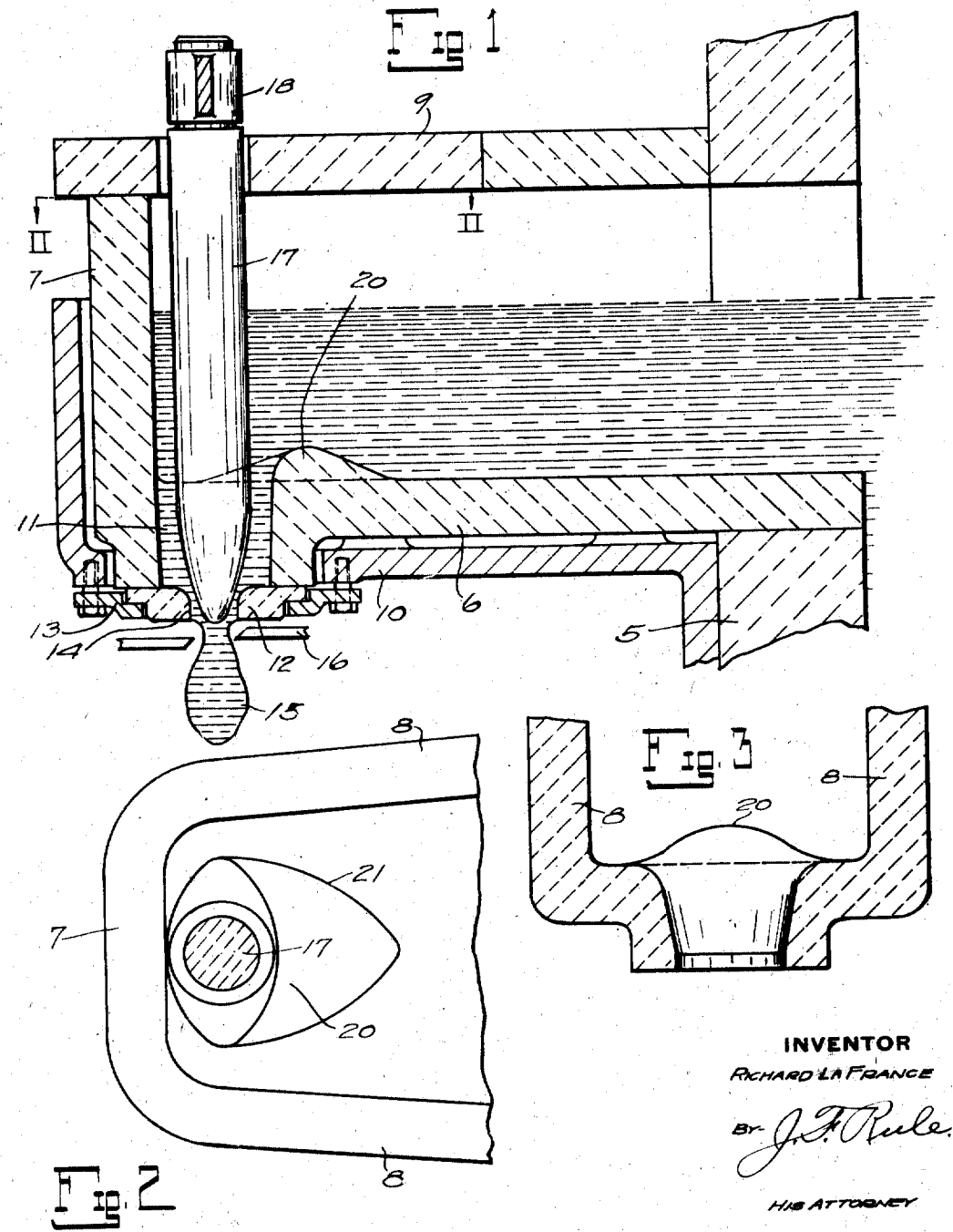

1,490,930

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

GLASS FEEDER.

Application filed March 21, 1922. Serial No. 545,572.

*To all whom it may concern:*

Be it known that I, RICHARD LA FRANCE, a citizen of the United States, residing at Toledo, in the county of Lucas and State of Ohio, have invented new and useful Improvements in Glass Feeders, of which the following is a specification.

My invention relates to glass feeding apparatus and more particularly to automatic feeders of the type in which a vertically reciprocating plug or plunger controls the periodic discharge of molten glass through an outlet opening in the bottom of a container.

In feeders of this type, it is customary to supply the molten glass from the main furnace or tank to a forehearth or boot extension having an outlet opening in the floor thereof. A regulating plug projecting downward through the glass toward or into the outlet opening provides, with said opening, an annular passage way through which the glass issues. With the usual construction there is a tendency for the glass on the side of the plunger nearest the furnace to flow more freely through the outlet, taking the shorter path, and for the glass on the front side of the plug, that is, the side more remote from the furnace, to become more or less chilled, so that the flow of glass in front of the plug is retarded, due both to this chilling effect and to the more indirect path of flow of the glass. As a result, the issuing gob or suspended charge of glass is unsymmetrical in shape and temperature. These inequalities are reflected to a greater or less extent in the finished ware.

An object of my invention is to overcome the above objections by the provision of means for securing a practically uniform flow of glass from all sides of the orifice and of substantially uniform temperature.

The preferred form of construction by which this object is attained is illustrated in the accompanying drawings, wherein:

Figure 1 is a sectional elevation of an automatic feeder constructed in accordance with my invention.

Figure 2 is a sectional plan at the plane of the line II—II on Figure 1.

Figure 3 is a front sectional elevation of the boot at the outlet orifice.

The melting tank or furnace 5 is provided with a forehearth or boot comprising a floor 6, front wall 7, side walls 8, and cover 9. The boot is supported by a cast iron frame 10. The forward end of the boot is formed with a well 11 in the floor thereof. A removable clay bushing or ring 12 at the bottom of the well is held in position by a supporting ring 13. The bushing 12 is provided with an outlet opening 14 through which the glass issues in the form of a suspended gob or gather 15 which is severed in the usual way by shears 16. A clay plug or plunger 17 carried by a yoke 18 projects downward into the glass and is reciprocated over the outlet to control the periodic discharge of glass in a manner well known to those skilled in the art.

In accordance with my invention, the outlet opening is arranged quite close to the front wall 7 of the boot so that there is little or no floor space between said front wall and the front wall of the well or channel 11. As shown, the inner surface of the front wall 7 of the boot is in a plane tangent to the front wall of the well 11. This arrangement insures a practically uniform distribution around the plunger, of the issuing glass, and prevents chilling and stagnation of a body of glass in front of the plunger and thus prevents a one sided flow. In other words, the rate of movement of the glass downward is substantially uniform on all sides of the plunger.

To further assist in producing a uniform distribution of the flowing glass around the plunger, there is provided a hump or raised portion 20 behind the plunger, said hump provided with inclined walls 21 tapering and converging downwardly and rearwardly and merging into the floor of the boot. This hump forms a sort of dividing wall by which the flow of glass is deflected to opposite sides of the plunger. It will be noted that the sides of the projection 20 extend forward to or beyond the center line of the plug. The arrangement is such that there is a practically uniform distribution of the flowing glass around the plug.

Modifications may be resorted to within the spirit and scope of my invention.

What I claim is:

1. In glass feeding apparatus, the combination of a tank or furnace, a forehearth or boot extending therefrom, and comprising a vertical front wall, said boot formed with a well or passageway extending downward through the floor of the boot, the front wall of said well being substantially in line with the inner face of the front wall of the boot, a reciprocating plunger projecting downward into said boot to control the flow of glass therefrom, and a hump projecting upward from the floor of the boot below the normal level of the glass, said hump being immediately behind the plunger and extending laterally beyond the side surfaces of the plunger in position to deflect the flowing glass to opposite sides of the plunger.

2. The combination of a furnace, a forehearth or boot extending therefrom, said boot provided with a discharge opening through the bottom thereof, and a plunger projecting downward into said opening, said floor being provided with a hump or raised portion directly behind the plunger and beneath the normal level of the glass, the width of the hump being equal to or greater than the diameter of the discharge opening.

3. The combination of a furnace, a forehearth or boot extending therefrom, said boot provided with a discharge opening through the bottom thereof, and a plunger projecting downward into said opening, said floor being provided with a hump or raised portion directly behind the plunger and beneath the normal level of the glass, said hump formed with downwardly and rearwardly converging side walls, the front wall of the hump extending laterally beyond the side walls of the discharge opening.

4. The combination of a furnace, a forehearth or boot extending therefrom, said boot provided with a discharge opening through the bottom thereof, and a plunger projecting downward into said opening, said floor being provided with a hump or raised portion directly behind the plunger and beneath the normal level of the glass, said hump projecting forward at opposite sides of the plunger to deflect and direct the flow of glass to the forward side of the plunger.

Signed at Toledo, in the county of Lucas and State of Ohio, this 18th day of March, 1922.

RICHARD LA FRANCE.